Sept. 19, 1967     A. P. G. STEFFES     3,342,208
RESILIENT MATERIAL VALVE
Filed Oct. 3, 1963
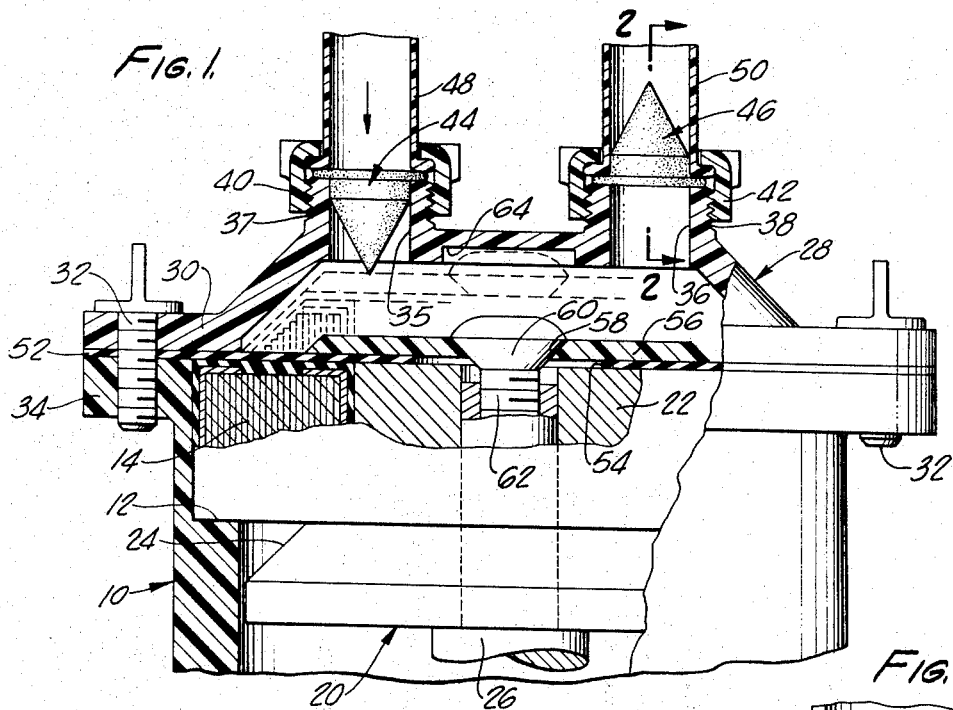
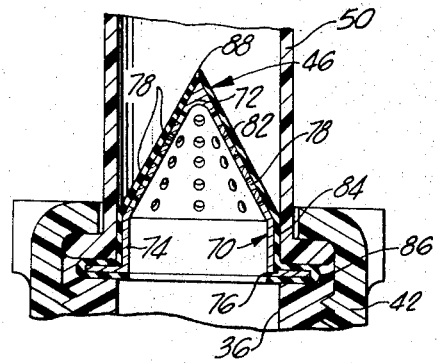
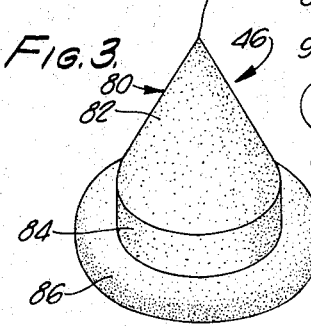
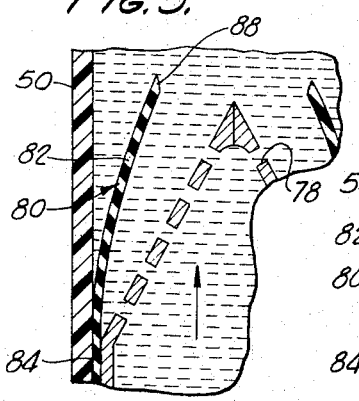
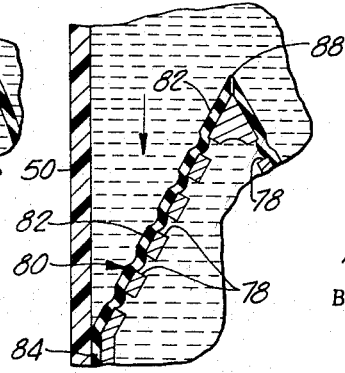
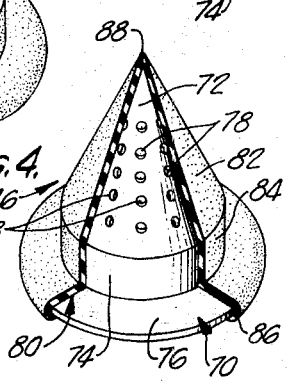
INVENTOR.
ADAM P. G. STEFFES
BY
Lyon & Lyon
ATTORNEYS

# United States Patent Office 3,342,208
Patented Sept. 19, 1967

3,342,208
RESILIENT MATERIAL VALVE
Adam P. G. Steffes, 707 S. Hill St.,
Los Angeles, Calif. 90017
Filed Oct. 3, 1963, Ser. No. 313,555
1 Claim. (Cl. 137—516.11)

This invention relates to valves and more particularly relates to a valve that is simple to construct and easy to clean or replace.

In my copending application Ser. No. 277,353 filed May 1, 1963 and entitled, Pump, now U.S. Patent No. 3,200,757, there is disclosed a pump in which the material moved by the pump is completely isolated from the metal parts of the pump so that the material pumped will not be contaminated in any way by the metal or moving parts of the pump. The pump disclosed therein has a relatively short stroke, a minimum of moving parts, all of which are subjected to a minimum of frictional wear, and can be easily assembled and disassembled for economical manufacture and rapid cleaning. The full operational details of that pump are set out in my copending application.

This invention provides a valve which is particularly useful in pumps such as that described in my copending application, and the valve of this invention is therefore described in such an environment. The present valves, and that pump, are particularly adapted for use in a blood circulation system where dependability and ease in cleaning are especially important. It should be understood, however, that the valve of the present invention may be used in many other applications. The valve is rapid acting, easy to install and clean, and simple and inexpensive to manufacture, yet insures positive prevention of reverse flow of the liquid in a line.

It is an object of the present invention to provide a simple, inexpensive, efficient and quick acting valve.

It is also an object of the present invention to provide such a valve wherein a conical flexible and elastic member cooperates with a conical mandrel or valve seat to permit the flow of fluid in only one direction.

These and other objects and advantages of the present invention will become more apparent upon reference to the accompanying description and drawings in which:

FIGURE 1 is a side elevation, partly in section, of a pump incorporating the valve of the present invention.

FIGURE 2 is an enlarged cross-sectional view taken along lines 2—2 of FIGURE 1.

FIGURE 3 is a perspective view of the valve of the present invention.

FIGURE 4 is a prespective view of the valve of the present invention with a portion of the flexible member cut away.

FIGURE 5 is a sectional detail of the valve of the present invention in its fluid passing condition.

FIGURE 6 is a sectional detail of the valve of the present invention in its fluid blocking condition; and FIGURE 7 is a view, partly in section, showing a modification of the valve of the present invention.

Referring now to the several figures, a pump is contained in a cylindrical body member 10 having an internal annular shoulder 12 therein. A spring assembly 14 is mounted on this shoulder 12. The construction and operation of this spring assembly 14 is fully disclosed in my previously identified copending application and will not be fully described herein. A piston 20 has an upper cylindrical portion 22 for cooperating with the spring assembly 14 as described in my copending application. A flared lower portion 24 of the piston 20 forms a support for the spring contained in the spring assembly 14 while it is flexed, insuring positive propulsion.

A piston rod 26 abuts the lowermost portion of the piston 20 and has a reduced portion that extends through a central bore in the piston 22 to a position slightly below its upper surface.

A cap 28 of plastic or other suitable material is provided with an annular flange 30 which is clamped by screws 32 to an annular flange 34 of the body 10. The cap 28 is provided with an inlet port 35 and an outlet port 36. The ports 35 and 36 are provided with external threads 37 and 38 for cooperation with sleeves 40 and 42 which maintain valves 44 and 46 and external conduits 48 and 50 in position. In applications where it is desired to visually inspect what is occurring in the system, such as when blood is being pumped, the cap, sleeves and conduits are preferably constructed of a transparent material.

A flexible and elastic diaphragm 52 is clamped between the flanges 30 and 34 and has a central opening 54. A plate 56 overlies this opening 54 and itself has a conical opening 58 therein. This conical opening 58 serves to receive the conical head 60 of a screw 62 which is screwed into the upper end of the extended portion of the piston rod 26 to secure the diaphragm 52 to the piston 20 in a fluid tight manner. The cap 28 is preferably provided with a recess 64 for receiving the head 60 of the screw 62 when the piston is in the extended position.

Referring now to FIGURES 2 through 6, the details of the valves 44 and 46 are shown.

Since both of these valves are identical, only the valve 46 is illustrated and explained in detail. As can be seen from these figures, the valve 46 has a hollow valve seat or mandrel 70 which has a conical upper portion 72, a cylindrical central portion 74 and an annular flange 76. The flange 76 is adapted to be received between the outlet port 36 and the external conduit 50 and held in place by the action of the sleeve 42 on these two members. The conical portion 72 is provided with a plurality of holes 78 therethrough in a region intermediate its apex and its base.

Positioned over the mandrel 70 is a flexible and elastic member 80, preferably constructed of a rubber such as surgical latex. The flexible and elastic member 80 has a conical upper section 82, a cylindrical section 84 and an annular flange 86 which extends around and under the flange 76. These sections correspond to the various sections of the mandrel 70. The conical section 82 is provided with a tightly closed pin hole opening 88 at its apex. The outer surface of the mandrel 70 is thus completely covered and enclosed by the flexible and elastic member 80 except for the pin hole opening 88.

The operation of the valve can be seen from FIGURES 5 and 6. FIGURE 5 shows the position of the elements of the valve 46 on the pumping stroke while FIGURE 6 shows the position of the elements of the valve 46 on the intake stroke. When the pressure in the interior of the mandrel 70 is greater by a predetermined amount than the pressure on the outer surface of the flexible and elastic member 80, the member 80 is forced away from the conical portion 72 of the mandrel 70 permitting fluid to pass through the holes 78 in this conical portion and thence through the expanded pin hole opening 88. When, however, the pressure on the outer surface of the flexible member 80 is greater than that in the interior of the mandrel 70, as during the intake stroke, the flexible member is forced into the holes 78 and the pin hole opening 88 at the apex of the member 80 is closed, with the result that no fluid can pass therethrough. The necessary pressure differential may, of course, be established by proper selection of the flexible material, its working area, and the size of the holes 78.

The operation of the valve 44 is identical except that the fluid passing state with relation to the pumping and intake strokes are reversed. The mandrel 70 of each of the valves 44 and 46 is illustrated as being constructed of metal. It may, of course, be made of a plastic or ceramic material, or any other suitable substance.

Referring now to FIGURE 7, there is shown a modification of the previously described valve. This valve is similar to that shown in the other figures with the exception that the mandrel is not provided with an annular flange but only with a conical portion 72 and a cylindrical portion 74, and, similarly, the flexible and elastic member 80 has only a conical portion 82 and a cylindrical portion 84. The cylindrical portion 74 of the mandrel and the cylindrical portion of the member 80 are preferably securely bonded together by means of a suitable adhesive. This valve may be directly inserted into a flexible pipe or tube 90 and held in place by a tight-fitting clamp 92 overlying and cooperating with the cylindrical portions of the valve.

The invention may be embodied in other specific forms not departing from the spirit or central characteristics thereof. The present embodiment is therefore to be considered in all respects as illustrative and not restrictive, the scope of the invention being indicated by the appended calims rather than by the foregoing description, and all changes which come within the meaning and range of equivalency of the claim are therefore intended to be embraced therein.

I claim:

A valve for insertion into a continuous flexible fluid line comprising a hollow mandrel, said mandrel having a conical portion and a tubular cylindrical portion, said conical portion having a plurality of holes formed therethrough only in a region intermediate its apex and its base, and a flexible and elastic member stretched tightly over said mandrel, said member having a tubular cylindrical portion overlying the cylindrical portion of said mandrel and adhesively affixed thereto, and a conical portion overlying said region and the remainder of said conical portion of said mandrel, said conical portion having as its sole perforation a small opening in the apex thereof, said conical portion of said member expanding away from said mandrel to pass fluid in a first direction and collapsing over said holes to prevent passage of fluid in the opposite direction, said small opening overlying an imperforate portion of said mandrel, said cylindrical portions being of greater lateral dimension than any other part of said valve whereby said valve may be bodily inserted in a flexible tube and the tube may be sealingly clamped, from the exterior thereof, about said cylindrical portions.

References Cited

UNITED STATES PATENTS

| 490,904 | 1/1893 | Gray | 137—525.1 X |
| 2,328,948 | 9/1943 | Bourke | 137—525.1 X |
| 2,642,259 | 6/1953 | Catlin | 137—515.7 X |
| 2,897,835 | 8/1959 | Philippe | 137—525.1 X |

FOREIGN PATENTS

| 88,138 | 4/1922 | Austria. |
| 958,889 | 2/1957 | Germany. |

WILLIAM F. O'DEA, *Primary Examiner.*

D. ZOBKIW, *Assistant Examiner.*